United States Patent
Falta

(10) Patent No.: US 7,867,642 B2
(45) Date of Patent: Jan. 11, 2011

(54) FUEL CELL START OPTIMIZATION

(75) Inventor: Steven R. Falta, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 1108 days.

(21) Appl. No.: 11/553,724

(22) Filed: Oct. 27, 2006

(65) Prior Publication Data

US 2008/0102326 A1 May 1, 2008

(51) Int. Cl.
*H01M 8/04* (2006.01)
(52) U.S. Cl. .................. 429/13; 429/428; 429/429; 429/431; 429/443
(58) Field of Classification Search .............. None
See application file for complete search history.

(56) References Cited

U.S. PATENT DOCUMENTS

| 5,766,787 A * | 6/1998 | Watanabe et al. ............ 429/494 |
| 6,214,487 B1 * | 4/2001 | Kelley et al. ................... 429/23 |
| 2005/0053810 A1 * | 3/2005 | Kato et al. ...................... 429/13 |

FOREIGN PATENT DOCUMENTS

| DE | 60005836 T2 | 5/2004 |
| EP | 1 513 209 A2 | 3/2005 |

* cited by examiner

*Primary Examiner*—Patrick Ryan
*Assistant Examiner*—Alix Echelmeyer
(74) *Attorney, Agent, or Firm*—Fraser Clemens Martin & Miller LLC; J. Douglas Miller

(57) ABSTRACT

A method of starting a fuel cell stack in subzero conditions that minimizes start times while avoiding cell reversal by using an iterative model to determine the optimal current density time profile for startup.

7 Claims, 4 Drawing Sheets

FUEL CELL START OPTIMIZATION

FIELD OF THE INVENTION

This invention relates to a method of operation for a fuel cell system. More particularly, the invention is directed to an improved method of starting a hydrogen fuel cell system in subfreezing temperatures.

BACKGROUND OF THE INVENTION

With fuel cells being desired for automotive purposes it has become important for fuel cells to achieve full power quickly. Subfreezing fuel cell startups have difficulty quickly reaching an appropriate power level.

Electrochemical fuel cells convert fuel and oxidant into electricity, a reaction product (such as water in the case of a hydrogen fueled and oxygen oxidizing fuel cell) and heat. The fuel cell typically has a membrane electrode assembly ("MEA") separating the fuel from the oxidant and the MEA is where the reactions take place. This membrane typically contains a catalyst and needs to be hydrated in order to function. The water to hydrate the membrane is formed on the oxidant side and can accumulate if the stack is operated at over 100% relative humidity. For subfreezing conditions this accumulated water can hinder fuel cell starts and can cause damage to the fuel cell. For this reason, an automotive fuel cell is sometimes dried using a gas purge when the system is shutdown. In order to be effective in each of the multiple cells which comprise the fuel cell stack, the gas purge must remove sufficient amount water while leaving the membrane enough hydration to allow a fuel cell to start. If the purge is not effective it leaves cells either too dry or too wet.

One of the problems if a fuel cell is left too wet is either side of an MEA can be covered with ice, preventing fuel and oxidant from reaching and reacting at the MEA. This would prevent the fuel cell from starting. Even if the MEA is only partially covered the water produced can freeze and cover the rest of the MEA if insufficient heat is produced to thaw out the cell. In any case ice covering part of the MEA will slow a fuel cell startup.

Another problem with a subfreezing start is that water can freeze and block the fuel or oxidant supply. If the water freezes and blocks the channels that are supposed to remove the water the fuel cell will flood stopping either the fuel or oxidant from reaching the membrane and stopping the fuel cell operation.

One way of making sure a fuel cell can start in subfreezing temperatures is to have it purge its channels at shutdown so that ice cannot clog the channels or cover the membrane and prevent the fuel cell from starting.

If the fuel cell is too dry the membrane conductivity will be insufficient to allow the fuel cell to operate at large loads. In this case a rapid start cannot be achieved and operation will be limited until the stack temperature rises and or the membrane becomes sufficiently hydrated during operation.

During a fuel cell start power is requested from the stack based on the demands of the system. This power is achieved by controlling the current density during the start based on cell voltage. The cell voltage is a function of current density and the membrane conductivity which is controlled by temperature and hydration. To meet the power request a current density will vary over time as temperature and cell hydration increase. However, due to system constraints, the maximum current density will be limited based on the minimum cell voltage at which the system can operate. The objective of a start is to reach the requested power request as quickly as possible while satisfying such system constraints. Based on the starting conditions, the current density during the start can be optimized to achieve this. A current density time profile is how the current density is going to be varied over time during startup. The ramp rate is how quickly the current density time profile is going to increase.

SUMMARY OF THE INVENTION

One way to accelerate reaching an appropriate power level is to have the fuel cell use a current density time profile which causes the cell to hold down its voltage during startup so that a greater amount of heat is produced. This extra heat can speed the cell toward reaching normal operating temperatures where higher efficiencies can be achieved. The problems with holding down the voltage are the potential for cell reversal which can damage the stack and the voltage needs of power electronics during startup which may require maintaining a minimum voltage.

This invention deals with the problems potentially caused by low voltage levels by providing a method to achieve the quickest start time while limiting average and minimum cell voltage. This is done by using a model to determine a current density time profile that will best accomplish the goal of a fast start without harming the fuel cell stack or failing to meet minimum voltage needs for power electronics.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The invention according to the present invention is a method for starting a fuel cell stack when it is at below freezing temperatures. Three factors have to be balanced when starting a fuel cell stack that is below freezing.

One factor is that it is possible to use a current density time profile with a fast ramp rate that will produce lower voltages during startup causing the fuel stack to less efficiently produce electricity and more efficiently produce heat. This increased production of heat can speed the fuel cell stack to operating at a temperature above freezing where it can function more efficiently.

A second factor is that if the voltage in the fuel cell stack is too low it can cause a cell to suffer fuel cell reversal causing damage to the stack.

A third factor is that the associated power electronics need a minimum voltage to be maintained during startup.

For automotive fuel cells, customers will expect start performance comparable to that of the internal combustion engine. This implies that a fuel cell must be able to reach full power in under 30 seconds even from subzero temperatures. In addition, during a start, the fuel cell voltage must be limited to satisfy the needs of power electronics and to prevent cell reversal which can damage the stack. The present invention provides a method to achieve the quickest start time while limiting minimum cell voltage.

Figure 1:
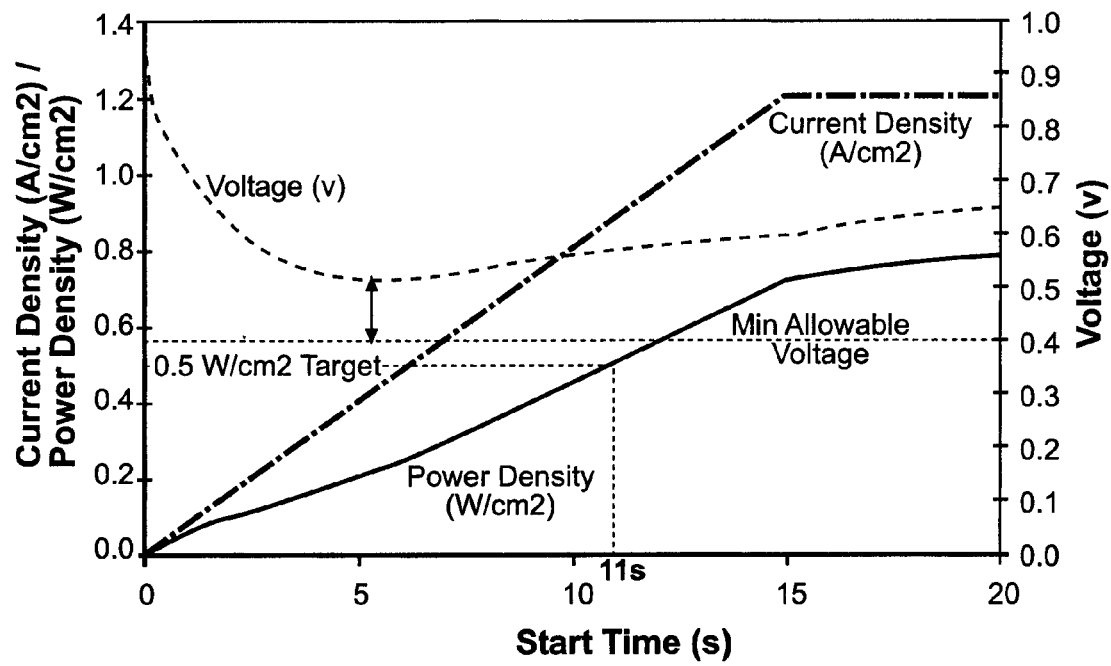
FIG. 1 is a graph showing the voltage, current density and power characteristics of a representative freeze start of a fuel cell according to the present invention.

FIG. 1 shows a graph of a representative freeze start from −25 C. The objective of this start is to reach a specific power density as quickly as possible—in this case 0.5 W/cm$^2$. Here the average cell voltage is well above the allowable minimum of 0.4V. During a start, this voltage is controlled by current density and membrane conductivity where conductivity is a function of membrane hydration and temperature. For a given initial temperature and membrane hydration, a fuel cells start performance can be controlled by the current density time profile. Typically, for simplicity, a linear time profile is used; however, this is not a limitation and many profiles can be employed. Importantly, it is possible to optimize or tailor a profile to minimize start time while simultaneously limiting cell voltage drop.

Figure 2:
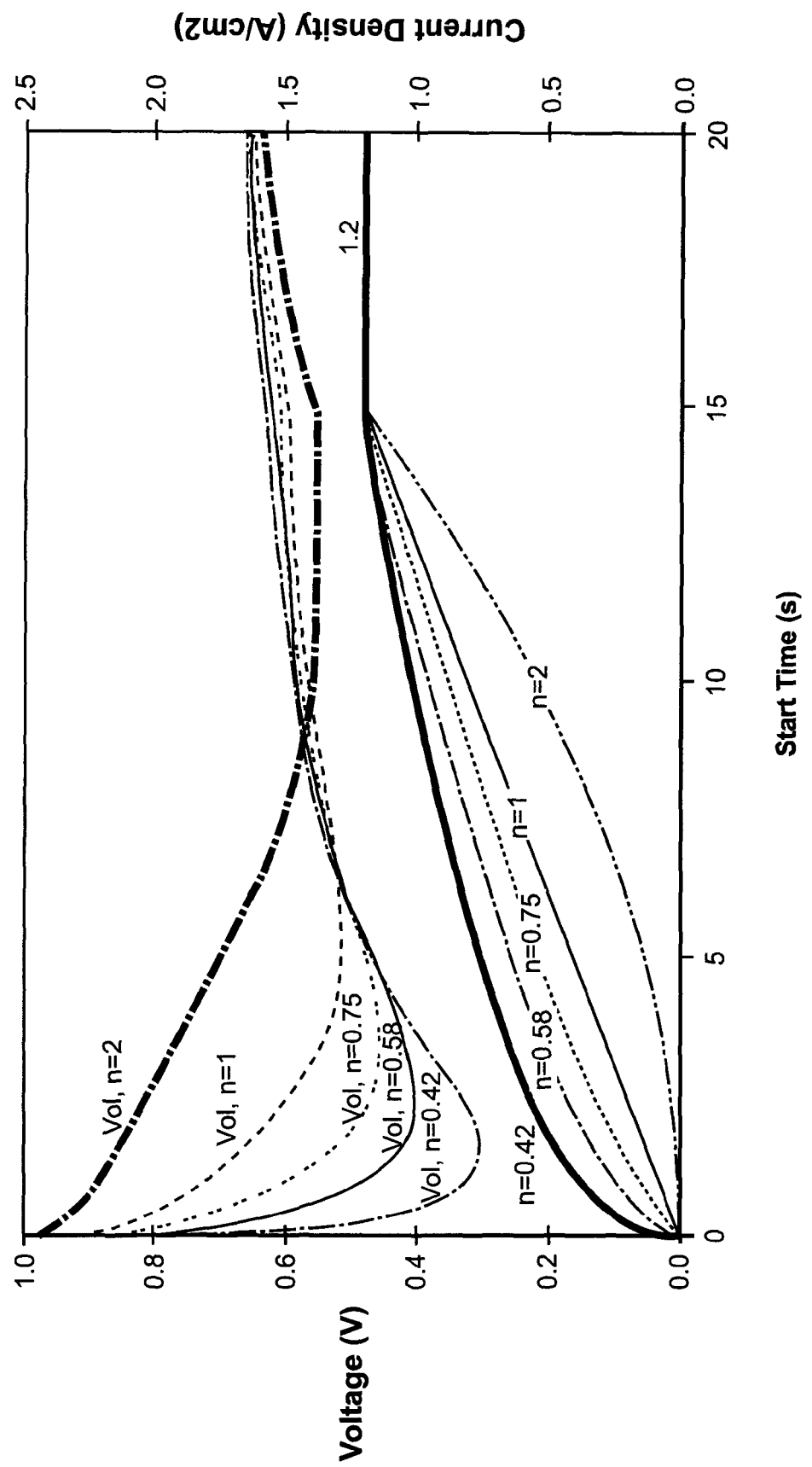
FIG. 2 is a graph showing the voltage characteristics versus current profiles produced by various ramp rates during a fuel cell start.

The freeze start performance of a fuel cell can be predicted using a model. This model predicts cell temperature, voltage, and membrane hydration. The required input is initial membrane hydration, stack temperature, and a current density time profile. An example of the impact of changing the current density profile on start time is shown in FIG. 2. Here a power law is used to specify current density time profiles or more specifically current density varies as time raised to the power of n (time$^n$). The smaller the value of n (<1) the faster the initial ramp rate and conversely the larger the value of n (>1) the slower the initial ramp rate. In FIG. 2, as the initial ramp rate is increased the minimum average cell voltage decreases.

Figure 3:
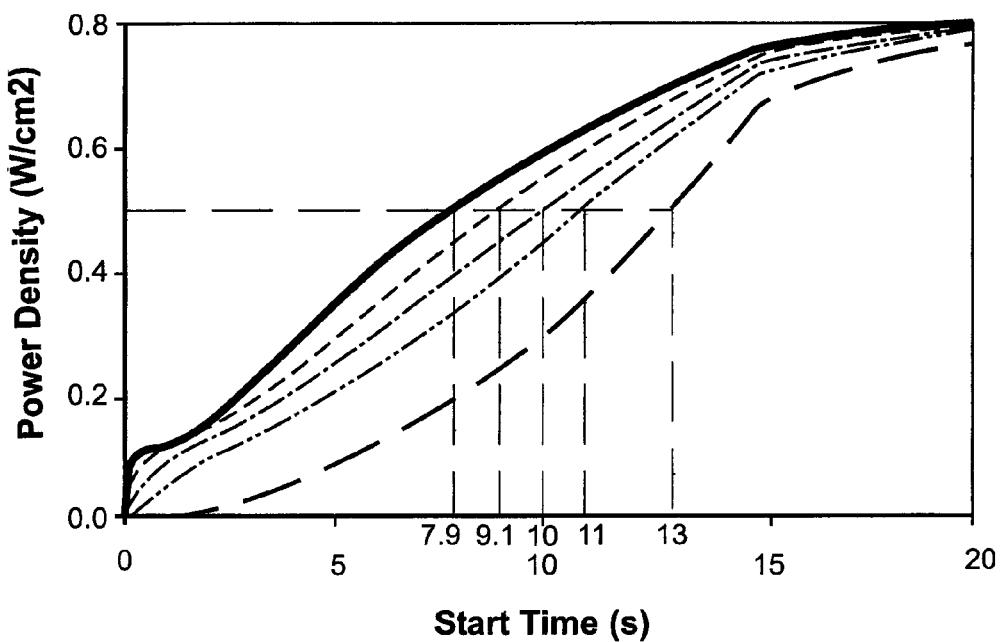
FIG. 3 is a graph showing power density profile during a fuel cell start.

FIG. 3 shows the impact of increasing initial ramp rate on start time. As the rate increases the start time decreases. This results from the lower voltage which increases the heat input to the stack and thus the rate of temperature rise. With the information shown in FIGS. 2 and 3, a current density profile can be chosen which can provide the quickest start while limiting minimum voltage.

Figure 4:
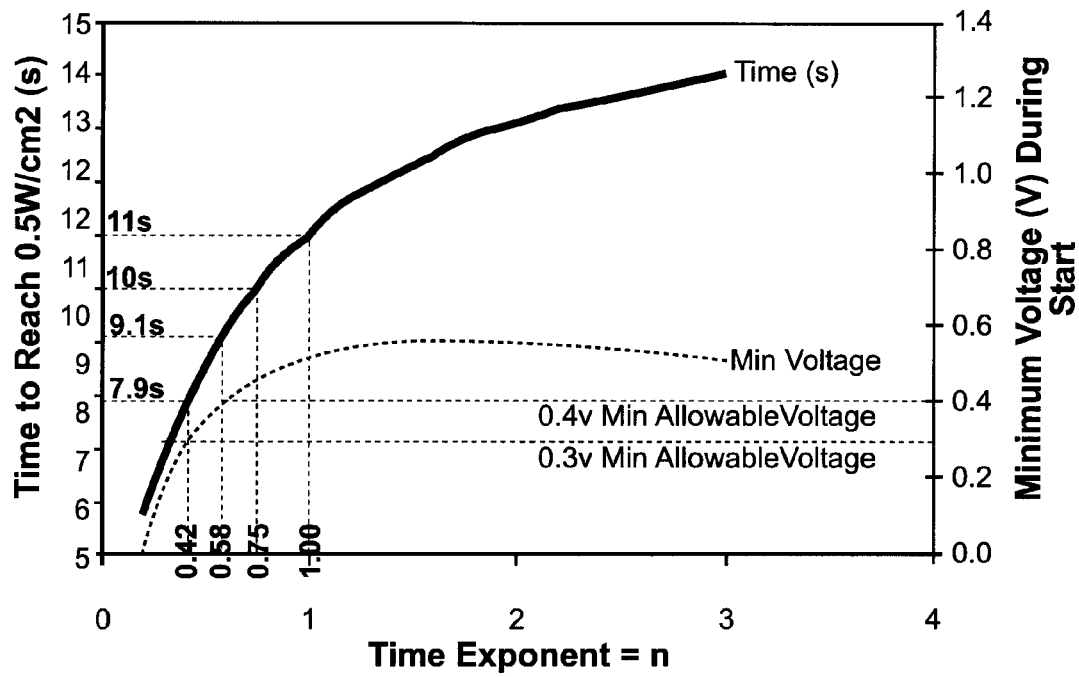
FIG. 4 is a graph of the impact of current profile on start time and minimum voltage.
Figure 5:
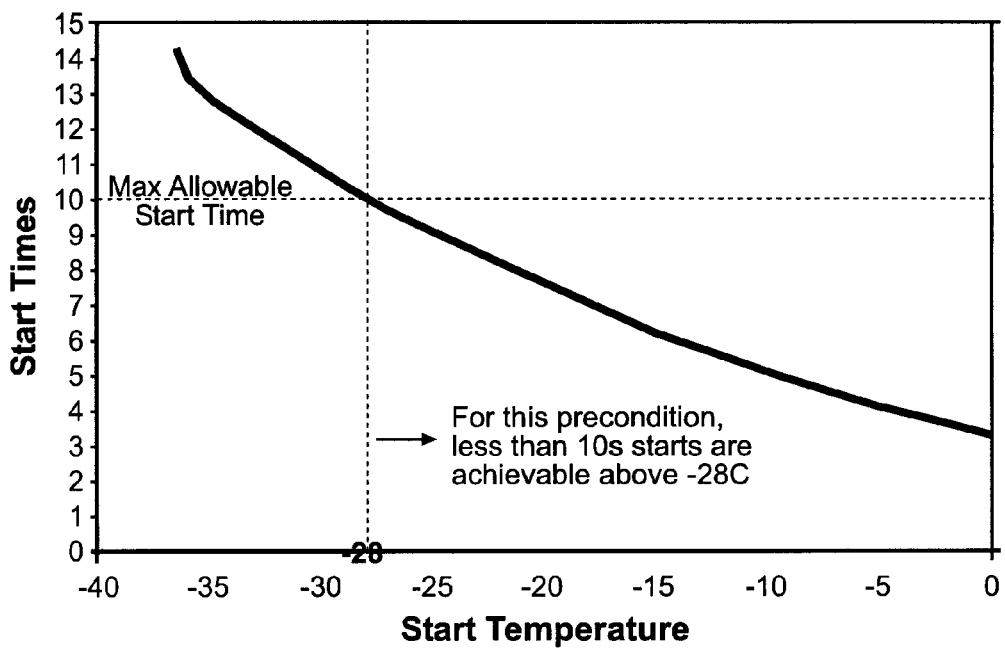
FIG. 5 is a graph of start time versus start temperature.

In FIG. 4, the impact on initial ramp rate on start time and minimum cell voltage is shown. For example, for a minimum voltage of 0.4V, a start time of less than 10 seconds is achievable with powers of n in the range of 0.58-0.75. From FIG. 5, a similar assessment can be made for various start temperatures. It is apparent that 10 second freeze starts are possible above −28 C and are not achievable below −28 C.

Figure 6:
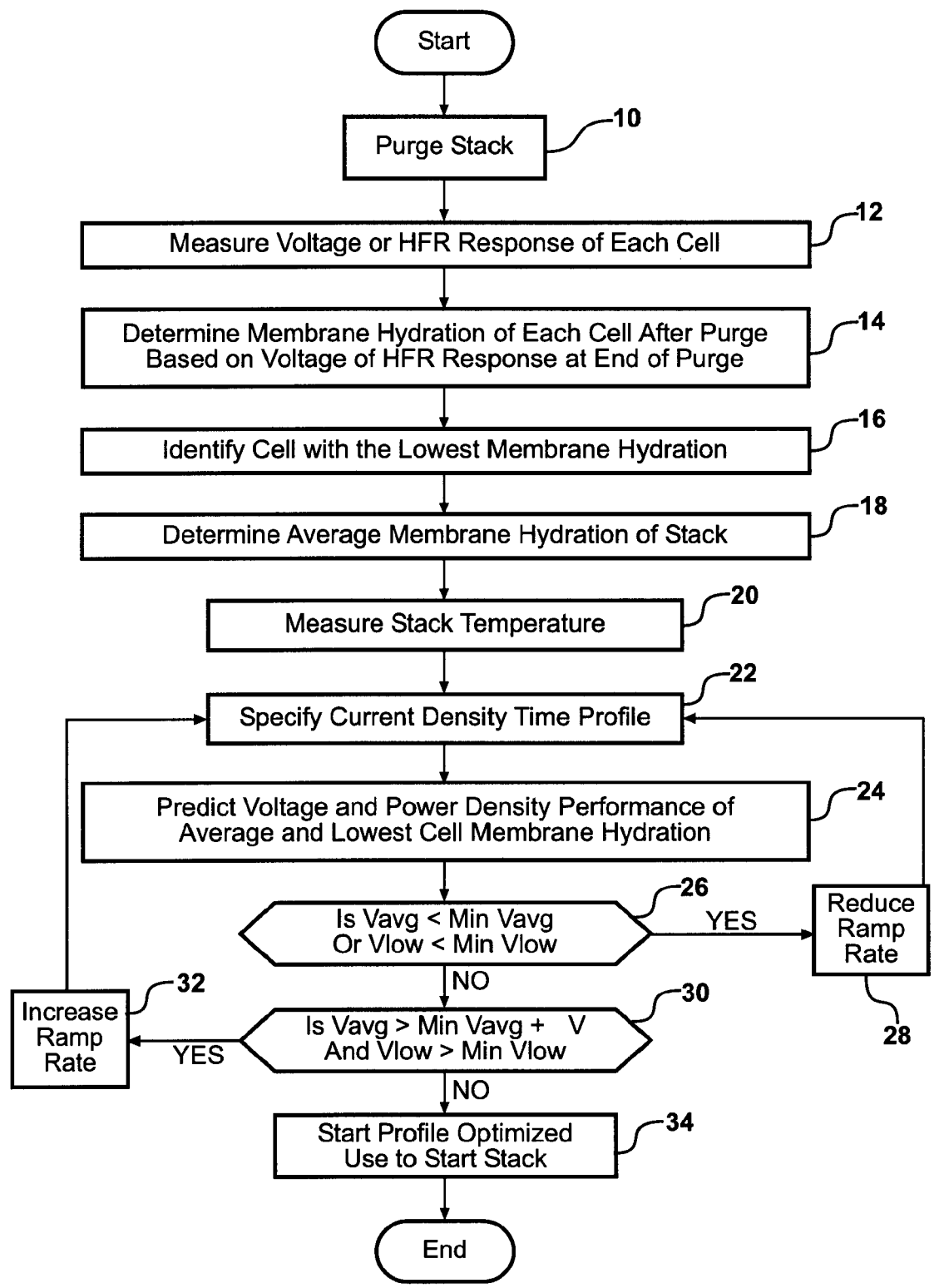
FIG. 6 is a flow diagram of the method for fuel cell start optimization according to the present invention.

An optimized balancing of the three factors discussed above is implemented in a fuel cell stack control system by using a model to predict both the average fuel cell performance (which can be converted into the fuel cell stack performance by multiplying the average performance by the number of cells in the stack) and the performance of the fuel cell most vulnerable to fuel cell reversal (the fuel cell with the lowest initial fuel cell membrane hydration). In order for the model to determine how a fuel cell is going to respond to a subfreezing start it needs the initial fuel cell membrane hydration, fuel cell stack temperature, and a Current Density Time Profile. FIG. 6 is a flow diagram for the method of fuel cell start optimization according to the present invention. The fuel cell membrane hydration for each cell in the stack is determined at the end of the stack purge (Step 10) during the shutdown of the stack (Step 14). This is done for example by measuring either the voltage response or the High Frequency Resistance (HFR) of each cell in a Step 12. Both the lowest fuel cell membrane hydration identification (Step 16) and the average fuel cell membrane hydration value (Step 18) are saved for use at startup.

At startup the stack temperature is measured (Step 20). The fuel cell performance model uses the stored hydration information, the stack temperature, and a default Current Density Time Profile (Step 22) to predict what the performance of the fuel cell would be including what the average voltage (Vavg) and the minimum voltage (Vlow) of that fuel cell would be (Step 24). The goal is to achieve the quickest start time while limiting minimum cell voltage. Vavg is checked against a minimum average voltage level (Min Vavg) needed during startup to make sure the voltage will be high enough. Vlow is checked against a minimum low voltage level (Min Vlow) to make sure this Current Density Profile would not cause cell reversal. If either value is to low (Step 26, Yes) the ramp rate of the Current Density Time Profile is reduced (Step 28) and the performance of the fuel cells is recalculated and rechecked (Step 22). This process of iteratively reducing the ramp rate will continue until both minimum voltages are met.

When both minimum voltage requirements are met (Step 26, No), the model will then require that Vavg be as close to the minimum Vavg as possible (Min Vavg+ΔV) while still having Vlow be greater than the minimum Vlow (Step 30). If both requirements of Step 30 are not met (Yes), the ramp rate of the Current Density Time Profile is increased (Step 28) and the performance of the fuel cells is recalculated and rechecked (Step 22). This process of iteratively increasing the ramp rate will continue until both voltage requirements are met (Step 30, No). Then, the start profile has been optimized and can be used to start the fuel cell stack.

The impact of different current density profiles on voltage is shown in FIG. 2. As the initial ramp rate is increased, the minimum average cell voltage decreases. FIG. 3 shows the impact of increasing the initial ramp rate on the start time. As the rate increases, the start time decreases. This results from the lower voltage which increases the heat input to the stack and thus the rate of temperature rise. With the information shown in FIGS. 2 and 3, the current density profile can be chosen which can provide the quickest start while limiting minimum voltage.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of managing a startup of a fuel cell stack to limit a minimum cell voltage and optimize a startup time, the method comprising the steps of:
   a. measuring a stack temperature in response to a request for stack startup;
   b. specifying a current density time profile based upon the stack temperature, a stored lowest membrane hydration and a stored average membrane hydration, wherein current density varies as time raised to the power of n (time");

c. calculating a voltage and a power density performance of an average cell with the average membrane hydration and a lowest cell with the lowest membrane hydration;
d. if the average cell voltage is less than a predetermined minimum average voltage or if the lowest cell voltage is less than a predetermined minimum low voltage, reducing a ramp rate and repeating said steps b. and c.;
f. if the average cell voltage is greater than the minimum average voltage plus a predetermined amount and the lowest cell voltage is greater than the minimum low voltage, increasing the ramp rate and repeating said steps b. and c.; and
g. if the average cell voltage is in a range of the minimum average voltage plus the predetermined amount and the lowest cell voltage is equal to or greater than the minimum low voltage, using the current density time profile to start the stack.

2. The method according to claim 1 including steps of purging the stack, measuring one of voltage and high frequency resistance response of each cell of the stack and determining a membrane hydration of each cell based on the measured one of voltage and high frequency resistance response.

3. The method according to claim 1 including a step of identifying and storing the determined lowest membrane hydration and average membrane hydration.

4. A method of optimizing a startup time of a fuel cell stack comprising the steps of:
a. purging a fuel cell stack during stack shutdown;
b. measuring one of voltage and high frequency resistance response of each cell of the stack after purging;
c. determining membrane hydration of each cell based upon the measurements performed in said step b.;
d. identifying a lowest cell with a lowest membrane hydration;
e. determining an average membrane hydration of the stack;
f. measuring a stack temperature in response to a request for stack startup;
g. specifying a current density time profile based upon the stack temperature, the lowest membrane hydration and the average membrane hydration, wherein current density varies as time raised to the power of n (time");
h. calculating a voltage and a power density performance of an average cell with the average membrane hydration and the lowest cell with the lowest membrane hydration; and
i. repeating said steps g. and h. by changing a ramp rate until the average cell voltage is in a range of a minimum average voltage plus a predetermined amount and the lowest cell voltage is equal to or greater than a minimum low voltage and then using the current density time profile to start the stack.

5. The method according to claim 4 including if the average cell voltage is less than a predetermined minimum average voltage or if the lowest cell voltage is less than a predetermined minimum low voltage, performing said step i. by reducing the ramp rate.

6. The method according to claim 4 including if the average cell voltage is greater than the minimum average voltage plus a predetermined amount and the lowest cell voltage is greater than the minimum low voltage, performing said step i. by increasing the ramp rate.

7. A method of managing the startup of a fuel cell stack to limit the minimum cell voltage and optimize the startup time, the method comprising the steps of
a. purging a fuel cell stack during stack shutdown;
b. measuring one of voltage and high frequency resistance response of each cell of the stack after purging;
c. determining membrane hydration of each cell based upon the measurements performed in said step b.;
d. identifying cell with lowest membrane hydration;
e. determining an average membrane hydration of the stack;
f. measuring a stack temperature in response to a request for stack startup;
g. specifying a current density time profile based upon the stack temperature, the lowest membrane hydration and the average membrane hydration, wherein current density varies as time raised to the power of n (time");
h. calculating a voltage and a power density performance of an average cell with the average membrane hydration and a lowest cell with the lowest membrane hydration;
i. if the average cell voltage is less than a predetermined minimum average voltage or if the lowest cell voltage is less than a predetermined minimum low voltage, reducing a ramp rate and repeating said steps g. and h.;
j. if the average cell voltage is greater than the minimum average voltage plus a predetermined amount and the lowest cell voltage is greater than the minimum low voltage, increasing the ramp rate and repeating said steps g. and h.; and
k. if the average cell voltage is in a range of the minimum average voltage plus the predetermined amount and the lowest cell voltage is equal to or greater than the minimum low voltage, using the current density time profile to start the stack.

* * * * *